United States Patent
Garcia Navarro

(10) Patent No.: US 9,986,299 B2
(45) Date of Patent: May 29, 2018

(54) SCHEDULED PROGRAMMING RECOMMENDATION SYSTEM

(71) Applicant: DISH Technologies L.L.C., Englewood, CO (US)

(72) Inventor: Carlos Garcia Navarro, Boulder, CO (US)

(73) Assignee: DISH Technologies L.L.C., Englewood, CO (US)

( * ) Notice: Subject to any disclaimer, the term of this patent is extended or adjusted under 35 U.S.C. 154(b) by 32 days.

(21) Appl. No.: 14/493,038

(22) Filed: Sep. 22, 2014

(65) Prior Publication Data

US 2016/0088358 A1    Mar. 24, 2016

(51) Int. Cl.
*H04N 21/482* (2011.01)
*H04N 21/2747* (2011.01)
(Continued)

(52) U.S. Cl.
CPC ... *H04N 21/4826* (2013.01); *H04N 21/23113* (2013.01); *H04N 21/2747* (2013.01);
(Continued)

(58) Field of Classification Search
CPC .......... H04N 21/4532; H04N 21/4334; H04N 21/482; H04N 21/4583; H04N 21/4335
See application file for complete search history.

(56) References Cited

U.S. PATENT DOCUMENTS 6,769,127 B1    7/2004  Bonomi et al.
7,543,322 B1 *  6/2009  Bhogal .............. H04N 5/44543
                                                  725/38
(Continued)

FOREIGN PATENT DOCUMENTS

CN    1579089 A     2/2005
EP    2 768 233 A1  8/2014
(Continued)

OTHER PUBLICATIONS

Govinde, "Intuitive Timer," U.S. Appl. No. 14/542,262, filed Nov. 14, 2014, 35 pages.
Navarro, "Scheduled Programming Recommendation System," U.S. Appl. No. 14/493,038, filed Sep. 22, 2014, 49 pages.
International Search Report dated Dec. 7, 2015, for International Application No. PCT/US2015/051269, 3 pages.

*Primary Examiner* — Brian T Pendleton
*Assistant Examiner* — Krista A Contino Saumby
(74) *Attorney, Agent, or Firm* — Seed IP Law Group LLP

(57) ABSTRACT

A scheduled programming recommendation system narrows down a user's electronic program guide to a short list of about a dozen recommended programs. The list is customized to the user's own interests according to a point scoring algorithm that compares program data with data from the user's viewing history. The content receiver is programmed to offer alternatives to users while engaged in a program, or within a short time interval near the end of a program. If the user switches to another ongoing program, there is an option to start the new program at the beginning. This option is made possible by a feature of the scheduled programming recommendation system that automatically records recommended programs in a background memory location, separate from the user's recorder memory space. Only recommended programs are automatically recorded. Access to recorded content is provided exclusively via the recommended list.

23 Claims, 13 Drawing Sheets

(51) Int. Cl.

| | | |
|---|---|---|
| *H04N 21/231* | (2011.01) | |
| *H04N 21/4335* | (2011.01) | |
| *H04N 21/466* | (2011.01) | |
| *H04N 21/432* | (2011.01) | |
| *H04N 21/422* | (2011.01) | |
| *H04N 21/475* | (2011.01) | |
| *H04N 21/4147* | (2011.01) | |
| *H04N 21/45* | (2011.01) | |
| *H04N 21/472* | (2011.01) | |
| *H04N 21/442* | (2011.01) | |
| *H04N 21/433* | (2011.01) | |
| *H04N 21/4788* | (2011.01) | |
| *H04N 21/441* | (2011.01) | |

(52) U.S. Cl.
CPC ..... *H04N 21/4147* (2013.01); *H04N 21/4221* (2013.01); *H04N 21/42207* (2013.01); *H04N 21/4325* (2013.01); *H04N 21/4334* (2013.01); *H04N 21/4335* (2013.01); *H04N 21/44222* (2013.01); *H04N 21/4532* (2013.01); *H04N 21/4667* (2013.01); *H04N 21/4668* (2013.01); *H04N 21/4755* (2013.01); *H04N 21/4756* (2013.01); *H04N 21/47202* (2013.01); *H04N 21/441* (2013.01); *H04N 21/4788* (2013.01)

(56) References Cited

U.S. PATENT DOCUMENTS

| | | | |
|---|---|---|---|
| 7,646,962 B1 * | 1/2010 | Ellis | G11B 27/105 386/248 |
| 7,912,824 B2 | 3/2011 | Anguiano | |
| 7,954,120 B2 | 5/2011 | Roberts et al. | |
| 8,132,205 B2 | 3/2012 | VanDuyn et al. | |
| 2002/0174429 A1 | 11/2002 | Gutta et al. | |
| 2003/0061239 A1 | 3/2003 | Yoon | |
| 2003/0084448 A1 | 5/2003 | Soundararajan | |
| 2003/0217365 A1 | 11/2003 | Caputo | |
| 2003/0220100 A1 | 11/2003 | McElhatten et al. | |
| 2004/0078823 A1 | 4/2004 | Schlarb et al. | |
| 2004/0261096 A1 | 12/2004 | Matz | |
| 2005/0028208 A1 | 2/2005 | Ellis et al. | |
| 2005/0120369 A1 | 6/2005 | Matz | |
| 2005/0149964 A1 | 7/2005 | Thomas et al. | |
| 2005/0163481 A1 * | 7/2005 | Hirai | G11B 27/105 386/248 |
| 2005/0210530 A1 | 9/2005 | Horvitz et al. | |
| 2005/0238315 A1 * | 10/2005 | Kataoka | G11B 27/034 386/296 |
| 2005/0246738 A1 * | 11/2005 | Lockett | H04N 5/4403 725/43 |
| 2006/0129547 A1 * | 6/2006 | Yamamoto | H04N 21/482 |
| 2006/0184967 A1 | 8/2006 | Maynard et al. | |
| 2007/0154163 A1 * | 7/2007 | Cordray | H04N 5/782 386/278 |
| 2007/0192796 A1 | 8/2007 | Iwabuchi et al. | |
| 2007/0244747 A1 | 10/2007 | Nikovski | |
| 2009/0019488 A1 | 1/2009 | Ruiz-Velasco et al. | |
| 2009/0100463 A1 | 4/2009 | St. John-Larkin | |
| 2009/0259518 A1 | 10/2009 | Harvey et al. | |
| 2010/0061661 A1 * | 3/2010 | Kamimaeda | H04N 21/25891 382/298 |
| 2010/0192172 A1 | 7/2010 | Thomas et al. | |
| 2010/0251304 A1 * | 9/2010 | Donoghue | H04N 21/25891 725/46 |
| 2011/0206342 A1 * | 8/2011 | Thompson | H04N 5/782 386/200 |
| 2011/0214147 A1 | 9/2011 | Kashyap et al. | |
| 2012/0331494 A1 * | 12/2012 | Pontual | H04N 21/44222 725/9 |
| 2014/0089953 A1 | 3/2014 | Chen et al. | |
| 2014/0189743 A1 | 7/2014 | Kennedy et al. | |
| 2014/0208349 A1 * | 7/2014 | Nair | H04N 21/6125 725/34 |
| 2014/0282626 A1 | 9/2014 | Petander et al. | |
| 2016/0014461 A1 * | 1/2016 | Leech | H04N 21/4668 725/14 |
| 2017/0055040 A1 * | 2/2017 | Volkman | H04N 21/4828 |

FOREIGN PATENT DOCUMENTS

| | | |
|---|---|---|
| GB | 2476136 A | 6/2011 |
| JP | 11-220673 A | 8/1999 |
| JP | 2000-293539 A | 10/2000 |
| JP | 2001-223959 A | 8/2001 |
| JP | 2003-189333 A | 7/2003 |
| JP | 2003-284008 A | 10/2003 |
| JP | 2006-121252 A | 5/2006 |
| KR | 10-2004-0102961 A | 12/2004 |
| WO | 99/45700 A1 | 9/1999 |
| WO | 02/25939 A2 | 3/2002 |
| WO | 2009/048753 A1 | 4/2009 |

* cited by examiner

Table I

| Event Name | Content Type | Total Mins Morn | Total Mins Aft | Total Mins Eve | Genre1 | Genre2 | Genre3 | Actor1/Actress1 | Director |
|---|---|---|---|---|---|---|---|---|---|
| Bones | Series | 0 | 92 | 115 | Comedy | Crime | Drama | Emily Deschanel | - |
| Friends | Series | 600 | 180 | 300 | Comedy | Romance | - | Jennifer Aniston | - |
| Top Gun | Movie | 0 | 110 | 110 | Action | Drama | Romance | Tom Cruise | Tony Scott |
| Fight Club | Movie | 0 | 0 | 140 | Drama | - | - | Brad Pitt | David Fincher |
| Seven | Movie | 0 | 0 | 120 | Crime | Mystery | Thriller | Brad Pitt | David Fincher |
| The Social Network | Movie | 0 | 0 | 120 | Biography | Drama | - | Jessi Elsenberg | David Fincher |
| Evening News | News | 0 | 0 | 300 | - | - | - | Brian Williams | - |
| Wimbledon | Sports | 320 | 0 | 0 | - | - | - | - | - |
| Oprah Show | Talk show | 155 | 0 | 102 | - | - | - | Oprah | - |

*FIG.11*

Table II

| Category: Content Type | Weighting Factor | Total minutes morning | Total minutes afternoon | Total minutes evening | Points morning | Points afternoon | Points evening |
|---|---|---|---|---|---|---|---|
| Series | 1 | 600 | 272 | 415 | 1 (56%) = 56 points | 1 (71%) = 71 points | 2 (32%) = 32 points |
| Movies | 1 | 0 | 110 | 490 | 4 (0%) = 0 points | 2 (29%) = 29 points | 1 (37%) = 37 points |
| News | 1 | 0 | 0 | 300 | 5 (0%) = 0 points | 3 (0%) = 0 points | 3 (23%) = 23 points |
| Sports | 1 | 320 | 0 | 0 | 2 (30%) = 30 points | 4 (0%) = 0 points | 5 (0%) = 0 points |
| Talk shows | 1 | 155 | 0 | 102 | 3 (14%) = 14 points | 5 (0%) = 0 points | 4 (8%) = 8 points |
| TOTAL | | 1075 | 382 | 1307 | 100% | 100% | 100% |

*FIG.12*

Table III

| Category: Genre | Weighting Factor | Total minutes morning | Total minutes afternoon | Total minutes evening | Points morning | Points afternoon | Points evening |
|---|---|---|---|---|---|---|---|
| Comedy | 1 | 600 | 272 | 415 | 1 (100%) = 100 points | 2 (28%) = 28 points | 1 (23%) = 23 points |
| Drama | 1 | 0 | 202 | 365 | 2 (0%) = 0 points | 3 (21%) = 21 points | 3 (19%) = 19 points |
| Action | 1 | 0 | 110 | 110 | 3 (0%) = 0 points | 4 (11%) = 11 points | 8 (6%) = 6 points |
| Crime | 1 | 0 | 92 | 235 | 4 (0%) = 0 points | 5 (10%) = 10 points | 4 (12%) = 12 points |
| Romance | 1 | 0 | 290 | 410 | 5 (0%) = 0 points | 1 (30%) = 30 points | 2 (22%) = 22 points |
| Mystery | 1 | 0 | 0 | 120 | 6 (0%) = 0 points | 6 (0%) = 0 points | 5 (6%) = 6 points |
| Biography | 1 | 0 | 0 | 120 | 7 (0%) = 0 points | 7 (0%) = 0 points | 6 (6%) = 6 points |
| Thriller | 1 | 0 | 0 | 120 | 8 (0%) = 0 points | 8 (0%) = 0 points | 7 (6%) = 6 points |
| TOTAL | | 600 | 966 | 1895 | 100% | 100% | 100% |

*FIG. 13*

SCHEDULED PROGRAMMING RECOMMENDATION SYSTEM

BACKGROUND

Technical Field

The present disclosure relates to the field of scheduled entertainment programming, and in particular, to a service that presents customized scheduled programming recommendations to users in real time.

Description of the Related Art

Media services offering real-time scheduled entertainment programs include businesses such as cable TV providers, radio broadcasters, satellite TV and radio providers, and Internet media providers. Typically such services also provide an electronic program guide (EPG) that lists a timetable of scheduled programs available to viewers on multiple channels. Most viewers have access to as many as several hundred channels that are tabulated or otherwise displayed in the EPG. Thus, perusing all of the programming choices listed in the EPG can be a tedious, inconvenient, and time-consuming task.

While a user, e.g., a TV viewer, a radio listener, or a smart phone user, is engaged in a particular program, the user may be unaware of other, more interesting programs that are being transmitted on unfamiliar channels. In some cases, the user may not have discovered a program that they might enjoy, simply because they are not aware that the program exists or they do not know where to locate the program in the EPG. A different problem is that a user might begin a program and, after several minutes, realize that they have already experienced that program, thus causing the user to lose interest and feel disappointed. However, if the user switches to a different channel, they will have missed the first several minutes of the program on the new channel. In short, with hundreds of channels, it is difficult for users keep abreast of what programs they might be missing.

BRIEF SUMMARY

A scheduled programming recommendation system narrows down a user's total list of program choices to a shorter, more manageable list of about a dozen recommended programs. The total list of program choices can include subscription content, pay-per-view (PPV) programming, video-on-demand (VOD) programming, advertising and promotional content, and the like. The user's subscription content may be prioritized ahead of programming that incurs additional fees. Program recommendations are customized to the user's own interests. Multiple users associated with a common media content receiver can be identified by maintaining separate user profiles and querying the user to select a user profile at the beginning of a session. The scheduled programming recommendation system determines the user's interests based on a user history, which can be stored in a memory inside the content receiver. The media service content receiver is programmed to offer alternatives to users while they are engaged in a program, or within a short time interval around the end of the current program. If the user decides to abandon the current program and switch to another program that is in progress, the user has an option to start the new program at the beginning. This option is made possible by a feature of the scheduled programming recommendation system that automatically records recommended programs. Recorded content generated by the scheduled programming recommendation system is saved and managed in a background memory location, separate from the user's recorder memory space, e.g., DVR memory. Only programs or portions of programs currently on the list are maintained in the background memory. Access to the recorded content is provided exclusively via the recommended list.

BRIEF DESCRIPTION OF THE SEVERAL VIEWS OF THE DRAWINGS

FIG. 11 is a table of viewing history data, according to one embodiment.

FIG. 12 is a points table for the "Content type" category, according to one embodiment.

FIG. 13 is a points table for the "Genre type" category, according to one embodiment.

DETAILED DESCRIPTION

Figure 1:
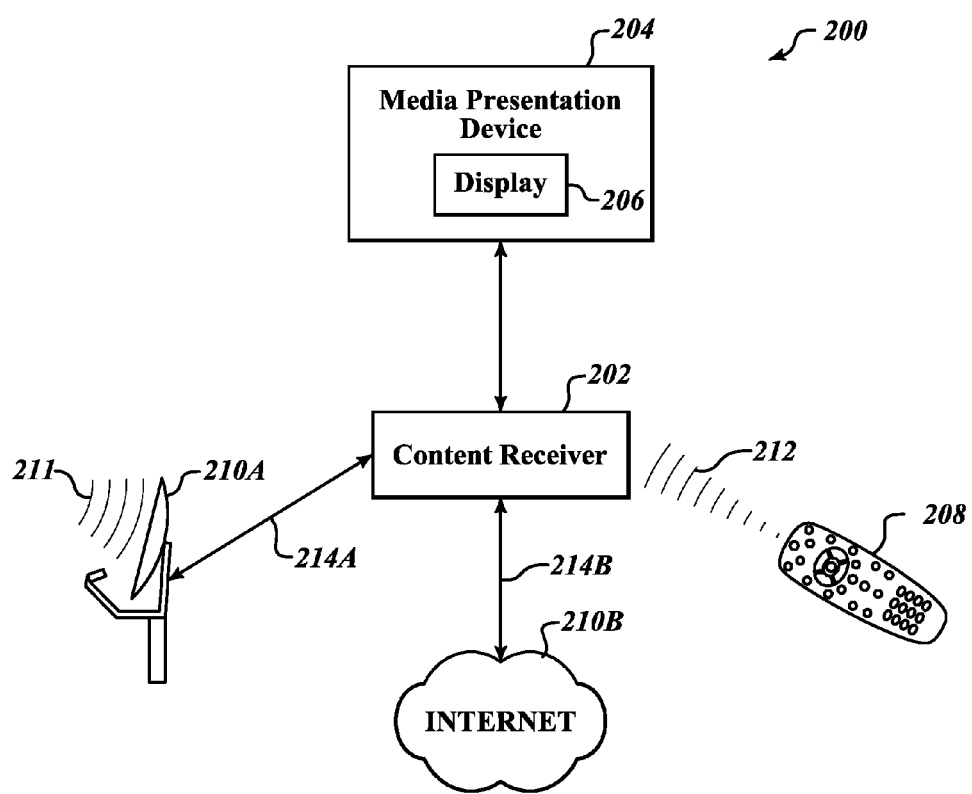
FIG. 1 is a block diagram showing components of a scheduled programming recommendation system, according to one embodiment described herein.

In this specification, embodiments of the present disclosure illustrate a subscriber satellite television service as an example. This detailed description is not meant to limit the disclosure to any specific embodiment. The present disclosure is equally applicable to cable television systems, broadcast television systems, Internet streaming media systems, or other television or video distribution systems that include user hardware, typically in the form of a receiver or set top box that is supported by the media provider or by a third party maintenance service provider. Such hardware can also include, for example, digital video recorder (DVR) devices and/or digital-video-disc (DVD) recording devices or other accessory devices inside, or separate from, the set top box.

Throughout the specification, the term "subscriber" refers to an end user who is a customer of a media service provider and who has an account associated with the media service provider. Subscriber equipment resides at the subscriber's address. The terms "user" and "viewer" refer to anyone using part or all of the entertainment system components described herein.

One skilled in the art will recognize that the present disclosure can also apply to other types of systems that offer smart menu services to end users. Such systems can include computer systems, networking systems, telephone systems, industrial equipment systems, medical equipment systems, and the like. While the disclosure shows and describes media-related embodiments, it will be understood by those skilled in the art that various other changes in the form and details may be made therein without departing from the spirit and scope of the invention.

The disclosure uses the term "signal" in various places. One skilled in the art will recognize that the signal can be any digital or analog signal. Those signals can include, but are not limited to, a bit, a specified set of bits, an NC signal, or a D/C signal. Uses of the term "signal" in the description can include any of these different interpretations. It will also be understood to one skilled in the art that the term "connected" is not limited to a physical connection but can refer to any means of communicatively or operatively coupling two devices.

As a general matter, the disclosure uses the terms "television converter," "receiver," "set top box," "television receiving device," "television receiver," "television recording device," "satellite set top box," "satellite receiver," "cable set top box," "cable receiver," and "content receiver," to refer interchangeably to a converter device or electronic equipment that has the capacity to acquire, process and distribute one or more television signals transmitted by broadcast, cable, telephone or satellite distributors. DVR and personal video recorder (PVR) refer interchangeably to devices that can record and play back television signals and that can implement playback functions including, but not limited to, play, fast-forward, rewind, and pause. As set forth in this specification and the figures pertaining thereto, DVR and PVR functionality or devices can be combined with a television converter. The signals transmitted by these broadcast, cable, telephone, satellite, or other distributors can include, individually or in any combination, Internet, radio, television or telephonic data, and streaming media. One skilled in the art will recognize that a television converter device can be implemented, for example, as an external self-enclosed unit, a plurality of external self-enclosed units or as an internal unit housed within a television. One skilled in the art will further recognize that the present disclosure can apply to analog or digital media content receivers.

As yet another general matter, it will be understood by one skilled in the art that the term "television" refers to a television set or video display that can contain an integrated television converter device, for example, an internal cable-ready television tuner housed inside a television or, alternatively, that is connected to an external television converter device such as an external set top box connected via cabling to a television. A further example of an external television converter device is the EchoStar Hopper combination satellite set top box and DVR.

In the figures, identical reference numbers identify similar features or elements. The sizes and relative positions of the features in the figures are not necessarily drawn to scale.

Turning now to the drawings, FIG. 1 illustrates a scheduled programming recommendation system 200, according to an exemplary embodiment. The scheduled programming recommendation system 200 can be located, for example, at a residence, office, or similar location for presenting entertainment media to various users. The scheduled programming recommendation system 200 includes a content receiver 202, a media presentation device 204 having a display 206, and a remote control 208. The content receiver 202 can be coupled to a network such as the Internet. The content receiver 202, e.g., a television set-top box (STB), can be coupled to the media presentation device 204 or the content receiver 202 can be in the form of hardware built into the media presentation device 204. Instructions that carry out features of the scheduled programming recommendation system 200 are stored in, and/or executed by, components of the content receiver 202.

The content receiver 202 is communicatively coupled to one or more sources of media content 210 (two shown, 210A and 210B) to receive the media content for presentation via the media presentation device 204. Sources of media content 210 can include one or more of a terrestrial television or radio antenna, a satellite television or radio antenna 210A, a broadband cable subscriber service, streaming media received from the Internet 210B directly or via a wireless Internet router, and the like. Media content is provided as a media signal, via communication links 214, e.g., a satellite antenna communication link 214A, or an Internet communication link 214B. The communication links 214 can accommodate a wired signal or a wireless signal. Furthermore, a content provider may provide to the user multiple media signals e.g., via satellite and/or via the Internet as shown, via broadband cable and/or Internet, or in any other suitable way.

The satellite receiving antenna 210A receives media content via a satellite signal 211 from one or more satellite transponders in earth orbit. Each satellite transponder is, for purposes of the scheduled programming recommendation system 200, a source of content that transmits one or more media channels, such as HBO, ESPN, pay-per-view channels, etc., to the satellite receiving antenna 210A. A satellite television distributor can transmit one or more satellite television signals to one or more satellites. Satellite television distributors can utilize several satellites to relay the satellite television signals to subscribers. Each satellite can have several transponders. Transponders transmit the satellite signal from the satellite to the satellite receiving antenna 210A.

The media presentation device 204 having the display 206 can be any electronic device that presents media content to a user for example, a television, a radio, a computer, a mobile computing device such as a laptop, a tablet, a gaming console, a smart phone, or the like, or the display 206 itself. The display 206 can be any kind of video display device such as a cathode ray tube display, a liquid crystal display (LCD), a plasma display, a television, a computer monitor, a rear projection screen, a front projection screen, a heads-up display, or any other electronic display device. The display 206 can be separate from, or integrated into, the media presentation device 204. The display 206 can include audio speakers, or the display 206 can be coupled to separate audio speakers. The term "for display" as used herein generally includes presentation of an audio component as well as a video component of the media signal.

The remote control 208 is configured to communicate with the content receiver 202 via a wireless connection 212 for example, an infrared (IR) signal. The remote control 208 can be operated by a user to cause the content receiver 202 to display received content on the media presentation device 204. The remote control 208 may also be used to display a programming guide on the display 206 and to communicate program selections to the content receiver 202. The remote control 208 can also be used to send commands to the content receiver 202, including channel selections, display settings, and the like. The signal 212 can use, for example, infrared or UHF transmitters within the remote control 208. One example of an embodiment of the remote control 208 is the EchoStar Technologies Corporation 40.0 Remote Control that includes an IR transmitter and an ultra-high frequency (UHF) transmitter. The remote control 208 may be able to send signals to other peripheral devices that form part of the scheduled programming recommendation system 200. The content receiver 202 may also be able to send signals to the remote control 208, including, but not limited to, signals to configure the remote control 208 to operate other peripheral devices in the scheduled programming recommendation system 200. In some embodiments, the remote control 208 has a set of Light Emitting Diodes (LEDs). Some remote controls can include Liquid Crystal Displays (LCDs) or other display screens. The remote control 208 can include buttons, dials, or other man-machine interfaces. While the remote control 208 can often be the common means for a user to communicate with the content receiver 202, one skilled in the art will recognize that other means of communicating with the content receiver 202 are available, including, but not limited to attached keyboards, smart phones, front panel buttons or touch screens.

Figure 2:
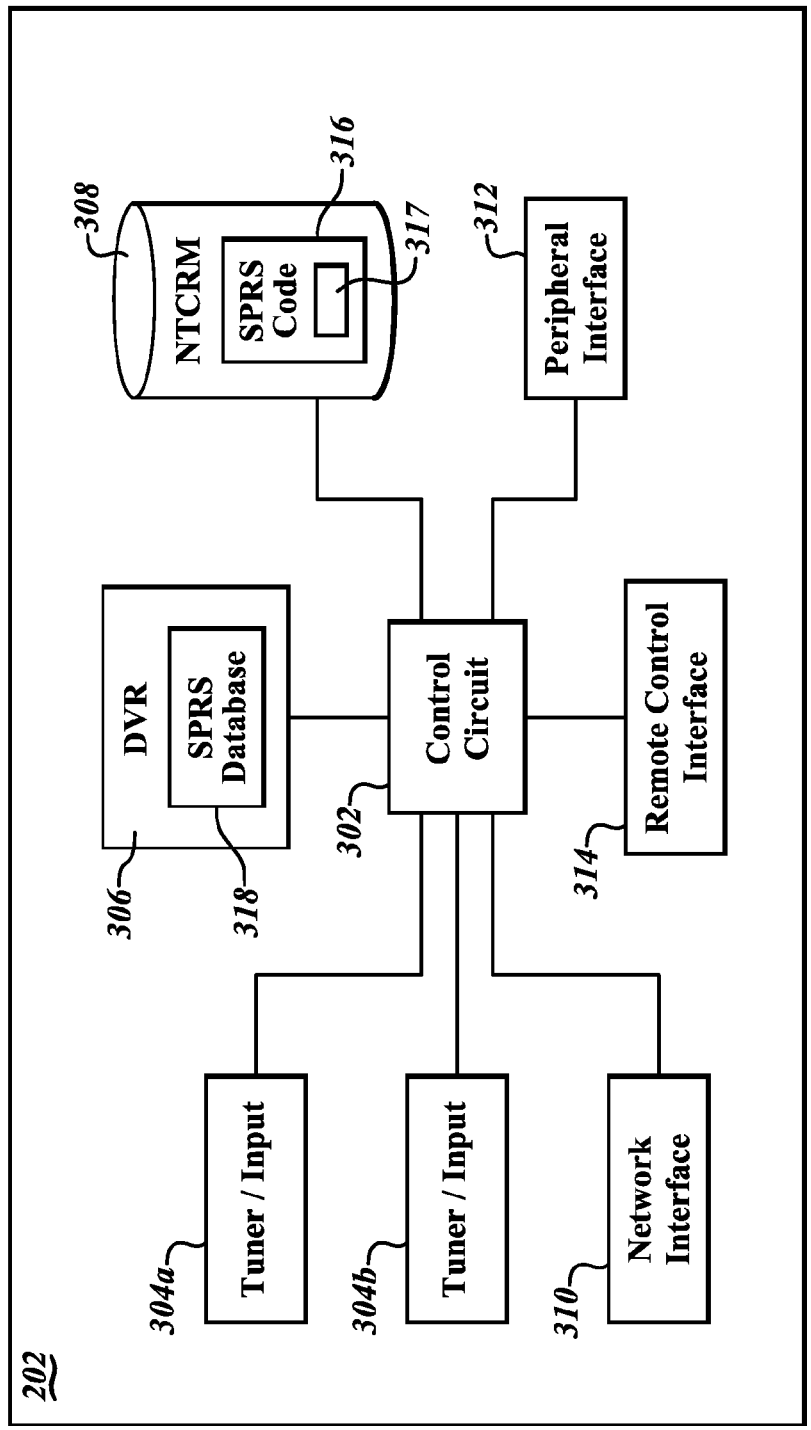
FIG. 2 is a block diagram showing components of a content receiver configured with a scheduled programming recommendation system (SPRS), according to one embodiment described herein.

FIG. 2 shows components of a typical content receiver 202 that is used in combination with an embodiment of the present disclosure. In one embodiment, components of the content receiver 202 include control circuitry 302, one or more tuners 304 (two shown, 304a, 304b), an optional internal digital video recorder (DVR) 306, a memory 308, a network interface 310, a peripheral interface 312, and a remote control interface 314. Scheduled programming recommendation system code 316 may reside in the memory 308 for execution by one or more processors within the control circuit 302. The scheduled programming recommendation system code 316 includes a recommendation engine 317. The memory 308 may be partitioned so as to include a database 318, accessible to the scheduled programming recommendation system code 316, wherein the database 318 provides storage specifically for use by the scheduled programming recommendation system 200.

Generally, the content receiver 202 can receive one or more television signals from a media provider such as a cable television distributor, a broadcast television distributor, the Internet, or a satellite television distributor. In addition, in the embodiment shown, the scheduled programming recommendation system 200 receives electronic program guide (EPG) information from a satellite television distributor via the content receiver 202. One skilled in the art will recognize that the content receiver 202 can also receive video-digital subscriber line (DSL), DSL, Internet, wireless and other signals from content or video distributors. The content receiver 202 can process television signals and can send the processed signals to peripheral electronic devices, such as the display 206 and the remote control 208. The content receiver 202 also can accept commands from the remote control 208 or other peripheral electronic devices. One skilled in the art will recognize that many embodiments of the scheduled programming recommendation system 200 are possible and within the scope of this disclosure. Other such embodiments can include, but are not limited to, various combinations or permutations of devices and connections for the delivery, storage, and display of communications, content and other data.

In one embodiment, the content receiver 202 receives media content from the satellite receiving antenna 210A. Each tuner 304 tunes into a selected media channel received by the satellite receiving antenna 210A to acquire the satellite signal 211. Tuners 304 initially process the satellite signal. When the content receiver 202 includes multiple tuners 304, the content receiver 202 can record two or more programs that air simultaneously. Generally, the content receiver 202 can record one show at a single time for each tuner 304 that the content receiver 202 includes. For example, if the content receiver 202 includes two tuners 304a and 304b, then the content receiver 202 can record and/or view two media programs simultaneously. Thus if there is a recording conflict between two programs, the content receiver 202 can still record both programs because it has two tuners. If a recording conflict occurs because the number of tuners 304 is less than the number of programs that the user wants to view or record, the control circuitry 302 can be programmed to resolve the conflict by prioritizing certain media content according to the subscriber's directions, or automatically, based on various criteria.

Each tuner 304 transmits an acquired satellite signal to the control circuitry 302 where the signal can undergo more extensive signal processing. The control circuitry 302 can be a content receiver decoder, such as, for example, the STi5517 Low-Cost Interactive Set top box Decoder, Part No. 7424736A, available from STMicroelectronics, Inc. Signals from the control circuitry 302 can include, but are not limited to, a signal to tune to a transponder as part of the process of selecting a certain channel for viewing on a peripheral device. A first step in signal processing by the control circuitry 302 can include, for example, demodulating the satellite signal. Further signal processing can include error checking. In one embodiment, the satellite signal 211 is in digital form, for example, a digital stream, after demodulation and error correction. The digital stream may use, for example, the digital video broadcasting (DVB) transport standard. The digital stream may be multiplexed and therefore require de-multiplexing to separate the digital stream into separate digital data streams. Each of the separate digital data streams may also be encoded and/or compressed to provide the system with increased bandwidth. In satellite television, encoding formats may include the MPEG, MPEG2 or MPEG4 standards. One skilled in the art will recognize that systems with analog data or combined analog and digital data are also possible and contemplated herein.

The control circuitry 302 may include one or more video processing units that, among other video processing operations, may decode the encoded digital television signal. The video processing units may include, for example, a graphics processor, MPEG-2 decoder and a display compositor with separate on-screen display (OSD) control for peripheral devices. The control circuitry 302 may further include a video encoder that encodes a digital stream for output to one or more peripheral devices, including, but not limited to, a television. Encoding may allow program data to be compressed. The control circuitry 302 may also include a storage device interface that couples the control circuitry 302 to storage devices such as the DVR 306 and the memory 308. An audio processing unit may also be part of the control circuitry 302. The audio processing unit may, for example, decode the digital stream for output to peripheral devices, including, but not limited to, a stereo, television speakers or portable audio or video players. The audio processing unit may include one or more processors, memory components or digital to audio converter (DAC) systems.

The control circuitry 302 includes one or more processors such as a central processing unit (CPU). The CPU may execute logical operations to execute functions of the content receiver 202 including, but not limited to, channel selection, system maintenance, recording control, EPG display and control, and functions of the scheduled programming recommendation system 200. Examples of commercially available CPUs include the STMICROELECTRONICS™ ENHANCED ST20™ 32-bit VL-RISC processor, or the INTEL XEON™ or ATOM™ series processors that are designed or adapted for servers. One skilled in the art will recognize that the CPU may be integrated with memory or other discrete electronic components. The control circuitry 302 may further include a custom application-specific integrated circuit (ASIC) chip, such as from the LSI LOGIC™ G11™ family, or FPGA, such as from the ALTERA STRATIX™ family. Alternatively, a microcontroller can be substituted for the CPU. Microcontrollers generally include, in addition to a CPU, extra program memory such as read-only memory (ROM), and input/output (I/O) functionality. The control circuitry 302 may further include one or more memory components that may be used for many purposes, including, but not limited to, storing EPG data and storing data for use by the CPU. Memory components may include volatile memory such as SDRAM memory chips and non-volatile memory devices such as ROM, SRAM, SDRAM and Flash ROM. One skilled in the art will recognize that volatile memory and non-volatile memory may be integrated within other electronic components and that other memory components may be included within content receiver 202 and control circuitry 302.

The DVR 306 may be used for many purposes, including, but not limited to, storing recorded programs and buffering currently playing programs to pause or rewind a program. The DVR 306 can be used to record programs locally in the content receiver 202. For example, while viewing the programming guide the user may notice a TV show that is not provided at a convenient time. By using the remote control 208 the user can command the content receiver 202 to record the TV show to the DVR 306 so that the user may view the TV show at a later convenient time. When the user selects a program to be recorded to the DVR 306, the content receiver 202 sets a recording timer that causes the content receiver 202 to automatically record the selected program at the scheduled time. At a time convenient to the user, the user can operate the remote control 208 to cause the content receiver 202 to display a list of programs that have been recorded to the DVR 306. The user can select the desired program from the list of recorded programs and the content receiver 202 will play back the selected program.

Alternatively, the content receiver 202 may access, via the Internet 210B, recorded programs stored on a remote storage device. In this case, when the user of the content receiver 202 selects a media program to be recorded, the media program is recorded to remote storage instead of to the DVR 306 inside the content receiver 202. The user of the content receiver 202 can schedule media program recordings by accessing the Internet 210B through a smart phone, a PC, a tablet, a laptop, or other suitable means. The user can log into an account associated with the content receiver 202 and can schedule recordings via the Internet 210B. The media programs can be viewed by connecting the content receiver 202 to the Internet 210B to access the remote storage device.

As the user selects multiple programs to be recorded to the DVR 306, it is possible that two or more of the media programs will have a time conflict in their scheduled air times. When the content receiver 202 determines that there is a time conflict between two media programs which are both scheduled to be recorded, the content receiver 202 follows a particular protocol to automatically assign respective priority levels to the two media programs. The media program that has a higher priority will be recorded at the expense of the media program that has the lower priority if the conflict cannot be resolved. The content receiver 202 can store in the memory 308 instructions that operate the DVR 306 according to such a protocol.

The content receiver 202 can also store in the memory 308 instructions that implement viewing recommendations as described herein. The viewing recommendations can be offered to subscribers as an optional scheduled programming recommendation system 200, in which case, when a subscriber orders the scheduled programming recommendation system 200, an associated scheduled programming recommendation system code 316 containing instructions is downloaded to the memory 308 for execution by the control circuitry 302 within the content receiver 202. The scheduled programming recommendation system code 316 can store program content in a scheduled programming recommendation system database 318 that represents a portion of the DVR 306. The DVR 306, equipped with high-density memory, is capable of storing large amounts of data, and is therefore appropriate for storing programming content for use by the scheduled programming recommendation system 200. The scheduled programming recommendation system database 318 may be partitioned from the rest of the DVR memory so that it is directly accessible by the scheduled programming recommendation system code 316, but not by users, whereas the DVR 306 is generally accessible by the subscriber.

The content receiver 202 can be connected to the display 206 through a peripheral interface 312 to send and receive signals to and from the display 206. For instance, a television can receive video and audio signals, whereas a stereo can receive only audio signals. A camcorder, on the other hand, can send video or audio signals to the satellite content receiver 202 or receive audio and video signals from the content receiver 202 to record. As another example, the peripheral interface 312 can include a processor or other electronic components to permit an interface to content security devices such as an external smart card. The peripheral interface 312 can then encrypt or decrypt content for output to other peripheral devices. Thus, the peripheral interface 312 can perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices can include many types of commercially available electronic devices.

Another peripheral device and connection to the satellite content receiver 202 can include a phone line and modem. Content receiver 202 can use a modem and phone line to communicate with one or more outside entities or systems e.g., a satellite television distributor. The phone line can carry local or long-distance telephone service. One skilled in the art will recognize that the phone line can also carry other services, including, but not limited to, DSL service. These communications can include requesting pay-per-view programming, reporting of purchases, for example, pay-perview purchases, obtaining updates to subscriber programming such as updating EPG data, or receiving updates to software on the satellite content receiver 202. For example, the phone line can communicate with the satellite content receiver 202 using an RJ-11 style telephone connection. One skilled in the art will recognize that there are many other uses for this phone line connection. For example, EPG data can be transmitted to content receiver 202 via the phone line or in the media signal. One skilled in the art will recognize that the EPG data can be transmitted to content receiver 202 by various other methods, systems and outside entities. Also, one skilled in the art will recognize that a phone line connection to the media service provider can represent other communication connections, including, but not limited to, wireless, Internet, or microwave communications connections. Another function of the phone line can be to periodically receive the EPG data. One skilled in the art will also recognize that a phone line connection can permit networked communications with other network-ready devices using the telephone wiring within a subscriber's location.

The network interface 310 provides network connectivity, for example, to the Internet 210B via a wireless router or a local area network. The peripheral interface 312 can include components that permit connection of RJ-45 network cabling and transmission of TCP/IP traffic to other connected devices. As another example, a wireless router can be attached via the peripheral interface 312 to allow wireless local-area-network (WLAN) data communications using a standard wireless networking protocol such as WiMAX, 802.11b or 802.11g. One skilled in the art will recognize that various other network connections to the content receiver 202 are possible.

The remote control interface 314 includes instructions that allow a user to communicate with the satellite content receiver 202, and can be implemented using the peripheral interface 312 or by connecting a separate remote control interface device. The remote control interface 314 can translate an input from the user into a format understandable by the control circuitry 302. The remote control interface 314 can thus be considered a user interface (UI). The translation systems can include, but are not limited to, electronic receivers and electronic relays. The remote control interface 314 can receive commands from more than one remote control 208. The remote control 208 can use infrared, UHF, or other communications technology. One skilled in the art will recognize that other means to receive and translate user inputs are possible.

The memory 308 can be used for many purposes, including, but not limited to, storing programming data, storing commands or functions for the control circuitry 302, storing timers or record events, and storing data for other devices within or connected to the satellite content receiver 202. In one embodiment, the memory 308 provides the long-term storage functionality of the content receiver, e.g., for persistent recordings and may also include operating system software and other data or software necessary to the content receiver, and the DVR 306 provides short-term storage functionality e.g., for temporary recordings of programs.

The memory 308 can be, for example, an 80 GB 'Winchester' hard drive connected to the control circuitry 302 via a standard IDE/EIDE interface cable. As another example, the memory 308 may be used to temporarily store data for processing by the CPU 322. In one example, the memory 308 may allow the CPU 322 to separate electronic programming guide data arriving as part of the digital stream. One skilled in the art will recognize that other storage devices and interfaces may be substituted for those shown and described herein while still remaining within the scope of this disclosure. One skilled in the art will also recognize that the storage device interface 328 and associated storage devices may separately or together include an integrated memory, e.g., a memory buffer, commonly referred to as cache, and additional processing components or logic. One skilled in the art will also recognize that the storage device interface 328 may be integrated into a peripheral interface 312. Finally, one skilled in the art will recognize that the memory 308 may be external and connected to the content receiver 202. For example, an external hard drive may be connected to the content receiver 202 using USB 2.0 or IEEE 1394 FireWire connections. Such an external hard drive may include a screen for portable viewing of programming stored on it. Furthermore, such a storage device can contain expansion slots, such as IDE connections, for the provision of additional storage devices to provide additional capacity at a later time. The design and operation of hard drives and similar devices are well known in the art and need not be described further here.

Figure 3:
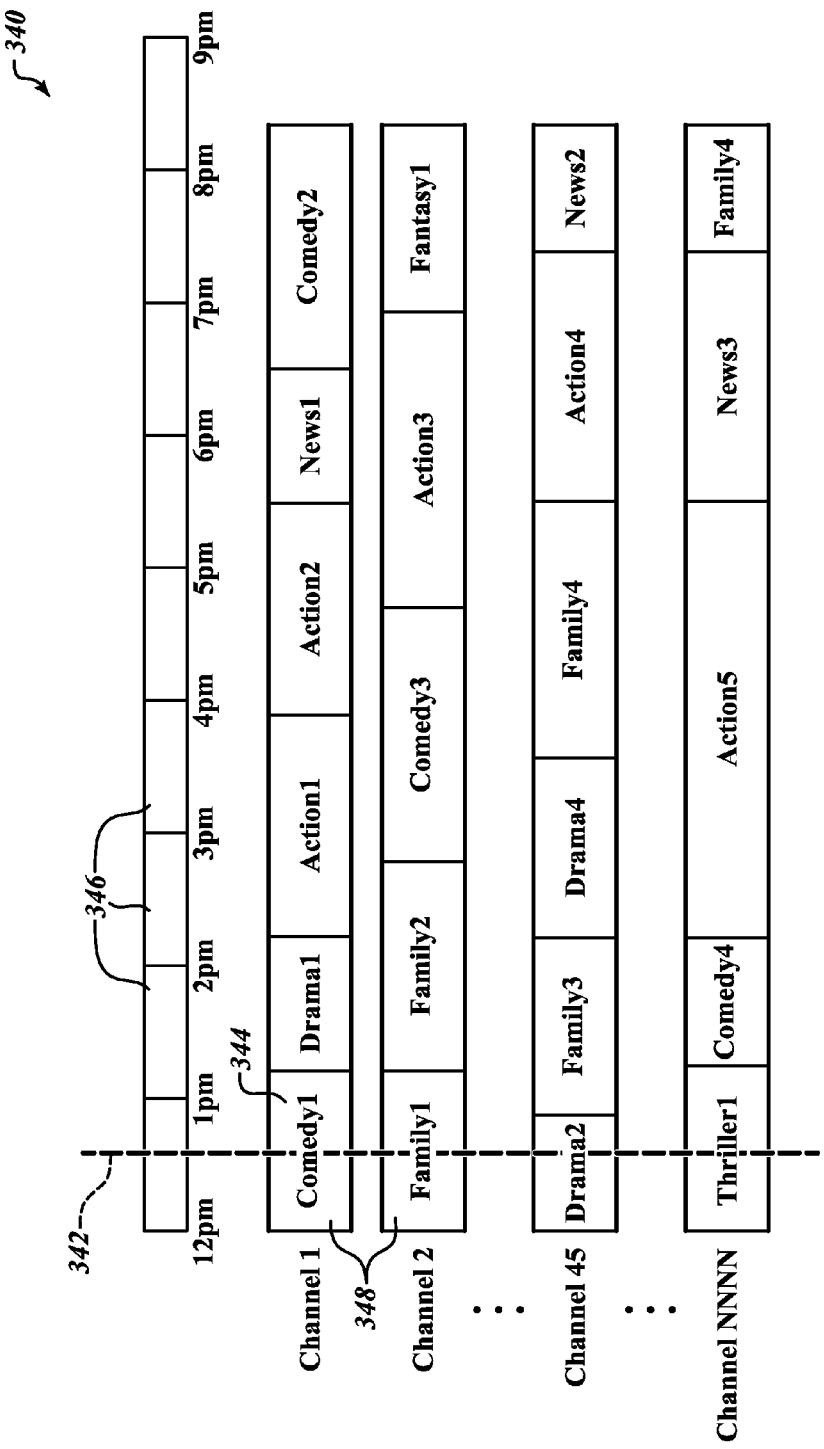
FIG. 3 is a chart showing an exemplary electronic program guide display that provides a comprehensive list of available media channels.

FIG. 3 illustrates an exemplary programming recommendation scenario, in which a viewer of a television subscription service offering a number NNNN of TV channels tunes in to channel 1 at 12:30 pm on a particular day. The scenario is represented by an exemplary EPG 340 onto which is superimposed a time line 342 representing the current time. The EPG 340 is a matrix in which columns 346 contain scheduled time slots, e.g., 12 pm-9 pm, and rows 348 are populated with available TV channels to watch, e.g., channels 1-NNNN. In the exemplary scenario, programs are represented by program genre categories such as comedy, family, drama, action, news, and the like. At the current time, e.g., 12:30, the user turns on the content receiver 202 and begins viewing current content 344, which is "Comedy1" in the example shown. Other options that the user could be watching instead of "Comedy1" include "Family1" on channel 2, "Drama2" on channel 45, and so forth, up to "Thriller 1" on channel NNNN. Following "Comedy1", channel 1 will show "Drama1". Alternatives to "Drama1" during the next time slot include "Family2", "Family3", and so forth, up to "Comedy4" on channel NNNN.

If the subscription associated with the content receiver 202 includes scheduled programming recommendation system features, the scheduled programming recommendation system 200 executes a scheduled program recommendation method 350 as specified in the scheduled programming recommendation system code 316.

Figure 4:
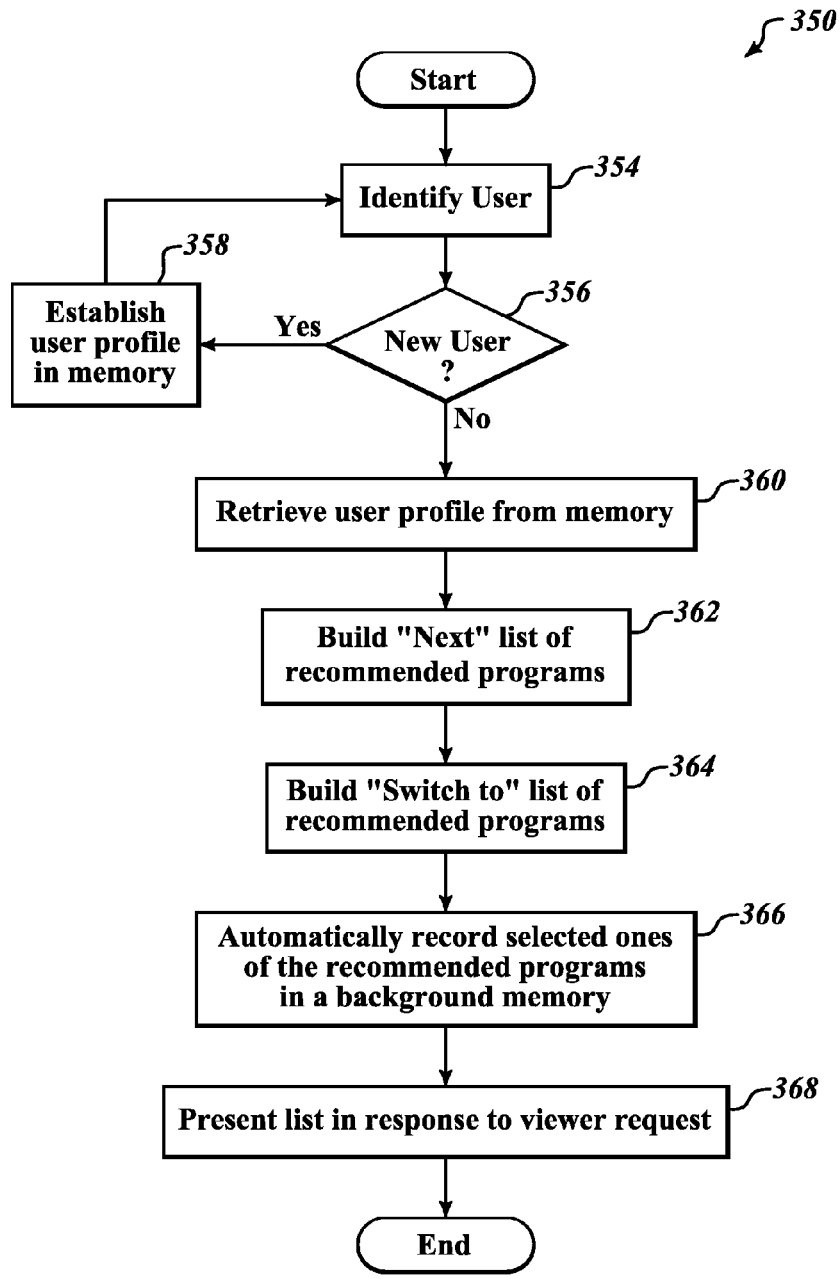
FIG. 4 is a flow chart showing a sequence of steps in an exemplary method of producing a recommended program list tailored to a user, according to one embodiment described herein.

FIG. 4 illustrates the computer-implemented method 350 that produces user-customized program recommendations via the scheduled programming recommendation system 200, according to one embodiment. The scheduled program recommendation method 350 is carried out by the content receiver 202 shown in FIGS. 1 and 2. The scheduled program recommendation method 350 employs one or more microprocessors within the content receiver 202 to execute the scheduled programming recommendation system code 316 stored in the memory 308. The scheduled programming recommendation system code 316 stores and retrieves program data in the scheduled programming recommendation system database 318 within the DVR 306. In particular, the recommendation engine 317 accumulates data and computes point values to determine which programs to recommend. In one embodiment, the scheduled program recommendation method 350 proceeds as follows:

At 354, the scheduled programming recommendation system 200 identifies the user. Identification can be accomplished, for example, by issuing a query on the display 206 that allows the user to select an identity from a list of known users, or in any other suitable way.

At 356, if the user is unknown to the scheduled programming recommendation system 200, the scheduled programming recommendation system 200 offers the user an opportunity to input identifying information to establish a new user profile at 358. The new user profile is then stored in the memory 308.

At 360, the scheduled programming recommendation system 200 retrieves the identified user's profile from the memory 308 to find out what types of programs the current viewer prefers, based on past viewing history.

Figure 5:
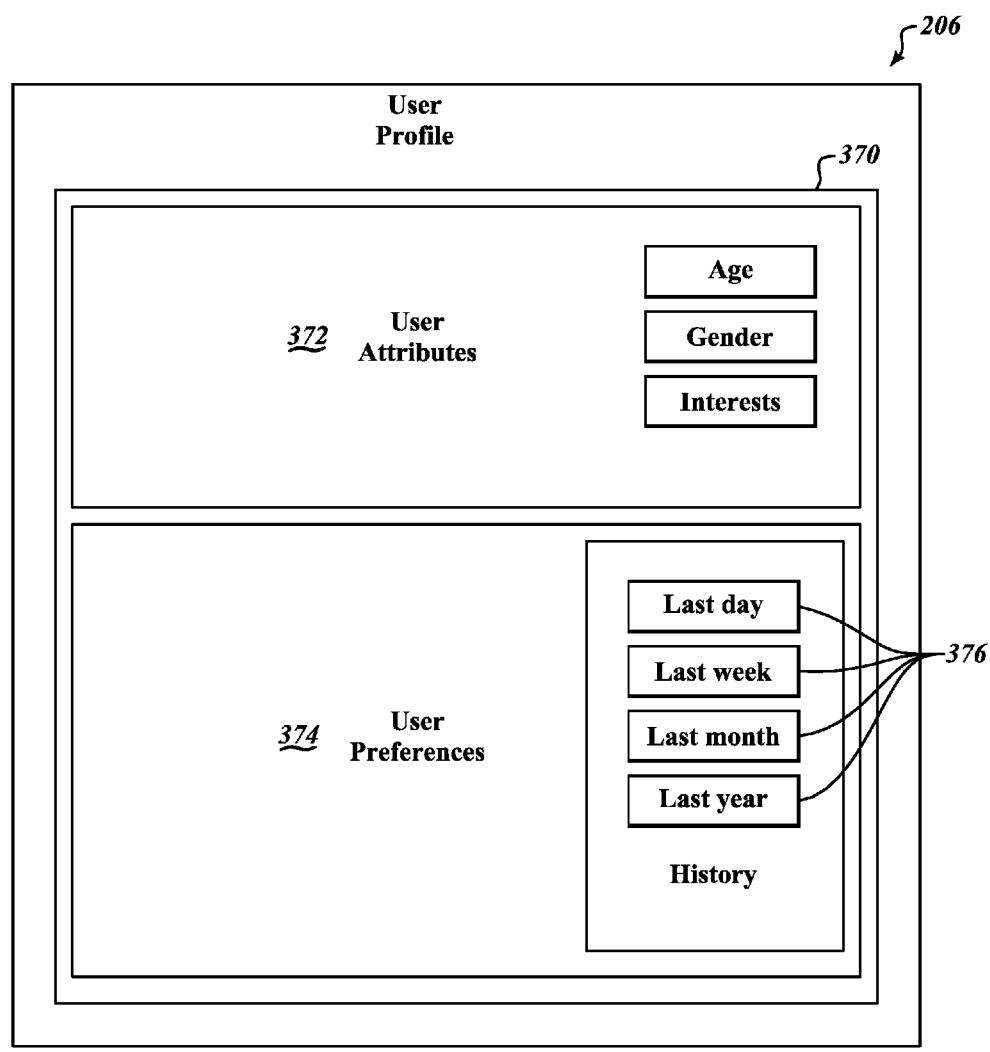
FIG. 5 is an exemplary screen shot displaying user information to a viewer, according to one embodiment.

FIG. 5 shows an exemplary embodiment of a user profile 370 as it appears on an exemplary display 206, e.g., a TV screen, in response to a user command from the remote control 208. The user profile 370 can include, for example, user attributes 372 and user preferences 374. The user attributes 372 pertain to the user, such as the user's age, gender, and interests, for example. The user preferences 374 can be inferred by the scheduled programming recommendation system code 316 from the user's viewing history. For example, the scheduled programming recommendation system 200 can be programmed to compute and maintain data describing the user's viewing history, such as how many programs the user selected in the last day, last week, or last month, in certain program categories. For example, the scheduled programming recommendation system 200 may categorize programs by genre such as, for example, comedy, drama, action, adventure, news, sports, thriller, family, and the like. The viewer's favorite program genre can then be determined according to the user preferences, based on their historical viewing frequency. For example, a user's most frequently selected genre may be "comedy," and their second favorite program genre may be family, while the user may hardly ever watch drama programming. Other criteria, in addition to program genre, that can be used to categorize programming includes, for example, content type, director, actors, and the like. Content types may include, for example, movies, shows, documentaries, sporting events, and the like. The scheduled programming recommendation system 200 can also maintain data sets based on different time intervals, for example, how many comedies did the user watch in the last month versus how many comedies did they watch in the last week, and thereby perceive trends that keep the user preferences current. Historical data may be accessed for viewing by the user via on-screen selection buttons 376, for example, as indicated in FIG. 5. If the user's frequency of comedy selections decreases over time and the number of action program selections increases over time, the scheduled programming recommendation system may dynamically adjust the user preferences to reflect such a change. Alternatively, in one embodiment, a user may be given write access to over-ride the accumulated user preferences by inputting user preferences directly.

At 362, a method of building the "Next" list is implemented in order of the point values assigned to the various candidate programs, as explained in more detail below, with reference to FIG. 8.

At 364, a method of building the "Switch to" list is implemented in order of the point values assigned to the various candidate programs, as explained in more detail below, with reference to FIG. 9.

At 366, as programs are added to the "Next" list, they are automatically recorded in the scheduled programming recommendation system database 318. So, if the viewer decides to switch to channel 45 at 1:00, there is an option to present "Family3" starting from the beginning, which was at 12:40 pm, so that the viewer does not miss the first 20 minutes of "Family3". This service may or may not be available for the "Switch to" list, depending on when the viewer tunes into the current program, and when the recommended programs are added to the list.

The number of recommended programs that can be automatically recorded depends on the number of tuners 304 in the content receiver 202, and how many of the recommended programs are running concurrently. A typical content receiver may have, for example, five tuners 304 which would allow simultaneous recording of up to five different recommended programs. If the DVR is set to record certain programs, the number of tuners available for automatic recording in the background may be less than the number of tuners 304 provided in the content receiver 202. The scheduled programming recommendation system 200 may be programmed to check whether or not a recommended program on the list is already recorded in the DVR 306 so that a duplicate recording need not be made. The number of recommended programs that can be recorded further depends on the format of the program, e.g., whether or not it is a high definition (HD) program, and on the available memory in the scheduled programming recommendation system database 318. The hard drive within the DVR 306 can be partitioned in various ways to store different types of content. Such partitioning can affect the space available in the scheduled programming recommendation system database 318. Once a program is recorded in the scheduled programming recommendation system database 318, it may be automatically erased after the user views the program, or after the program is no longer on the list of recommended programs. With a scheduled programming recommendation system, the database will be accessed frequently, and portions of programs will be routinely stored and erased in a dynamic fashion to keep up with the viewer's constantly changing decisions. In general, this ongoing recording and erasing activity is hidden from the user, and accordingly, background memory locations used to store recommended programs are inaccessible to users.

At 368, after constructing the "Switch to" and "Next" lists of recommended programming for the current viewer, the scheduled programming recommendation system 200 waits until a user request is received from the remote control 208 before presenting the lists to the user via the display 206. In one embodiment, the user request is sent from the remote control via a dedicated pushbutton, for example, called "My Programs." The user can be presented with the option to either view a program on the list, or record the program. The user can also be offered an option to share the list with other users or subscribers via text, e-mail, or a network-based forum such as FACEBOOK™ or TWITTER™, and the like. The remote control 208 can be configured with dedicated pushbuttons for view/record, or it can be programmed to use other key strokes to differentiate between these options. Once the user makes a selection, the user history is updated with the selection and the user preferences 369 based on the history and user attributes are re-calculated to reflect new data corresponding to the selection. The user can also remove program recommendations from the lists, which would also trigger halting and erasing an associated background recording. The scheduled programming recommendation system 200 will then incorporate such a user rejection into the user preferences, and the recommendation engine 317 will assign more weight to characteristics of the ongoing program when making future recommendations. Likewise, the scheduled programming recommendation system 200 incorporates user selections from the list of program recommendations, after the user tunes in to the recommended program for a minimum period of time.

Figure 6:
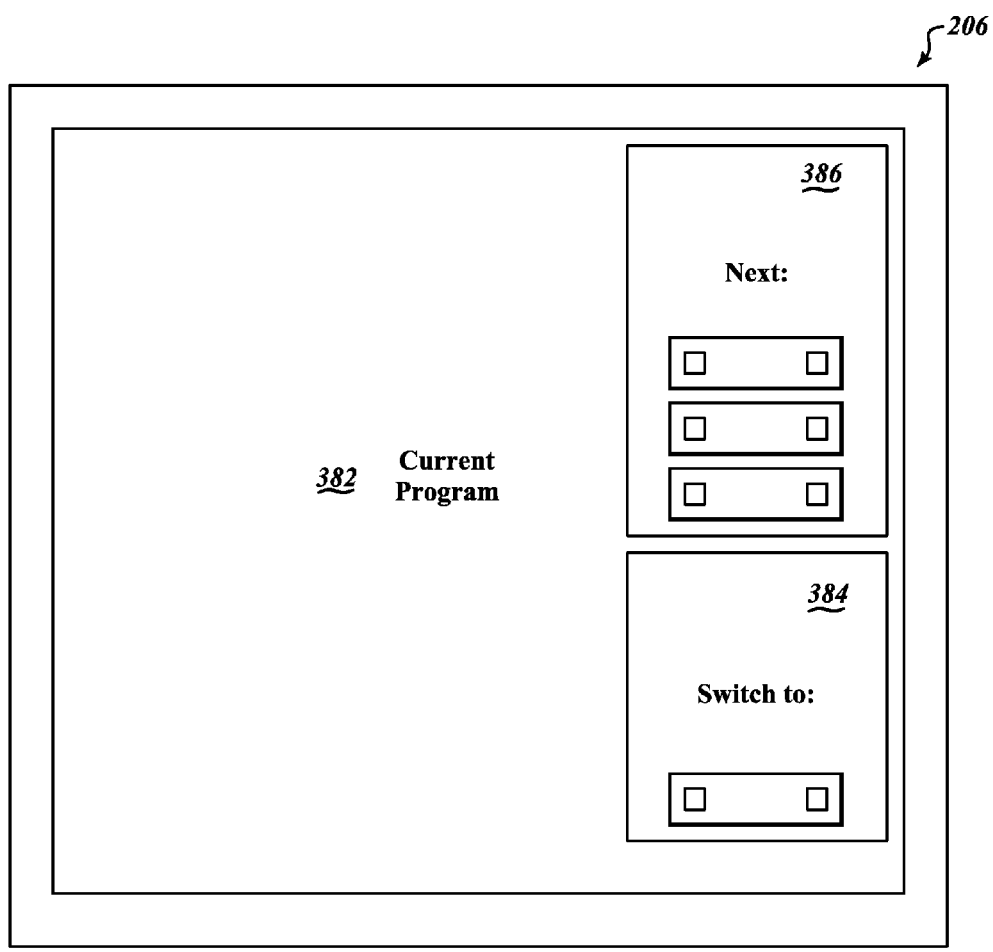
FIG. 6 is an exemplary screen shot displaying program recommendations to a viewer, according to one embodiment.

FIG. 6 shows an exemplary scheduled programming recommendation system output as it appears on an exemplary display 206, e.g., a TV screen, in response to a user command from the remote control 208. While a current program continues to display in a large main area 372 of the display 206, the "Switch to" list is displayed in a lower sidebar 374, while the "Next" list is displayed in an upper sidebar 376. Each sidebar may expand to show up to about a dozen programming choices for selection by the user. If the user does not select an option within a given time interval, e.g., 10 seconds, the sidebars 374 and 376 may be programmed to disappear. The time interval can have a variable value selected by the user and stored in the user attributes 368, for example. Likewise, the number of recommendations displayed can also be user-configurable. For example, in one embodiment the user can specify showing the top five recommendations. Alternatively, the scheduled programming recommendation system output may be presented on a display 206 associated with a radio, a smart phone, or other media presentation device 204.

Figure 7A:
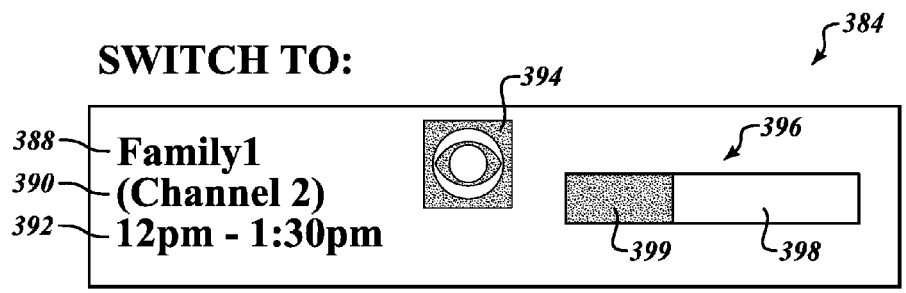
FIG. 7A is a close-up of an exemplary screen shot showing details of a switch-to recommended program list, according to one embodiment.
Figure 7B:
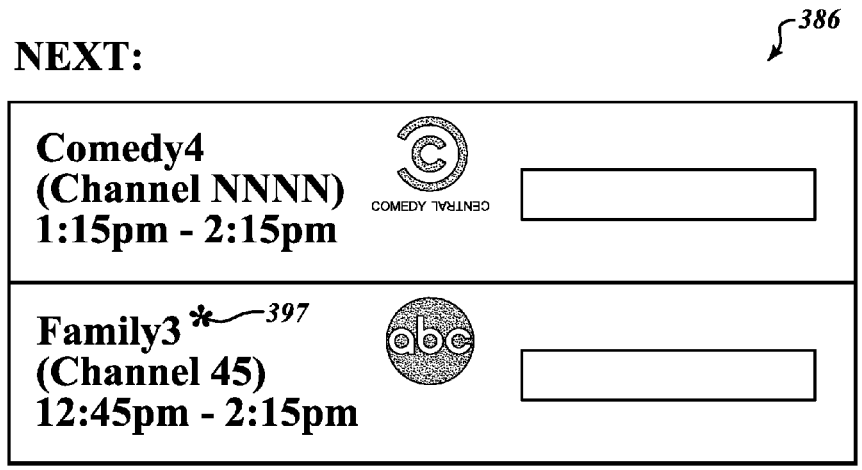
FIG. 7B is a close-up of an exemplary screen shot showing details of a next recommended program list, according to one embodiment.

FIGS. 7A and 7B show example program recommendation display formats 380 and 382 that may appear in the sidebars 374 and 376, respectively.

In one embodiment, the "Switch to" display format 384 includes a program name 388, channel 390, time slot 392, optional channel logo 394, and a graph 396 that indicates how much time has elapsed since the program started. The graph 396 may be, for example, a bar graph as shown that includes a first portion 398 that represents the portion of the program that is remaining, and a second portion 399 that represents the portion of the program that has already been presented. In one embodiment, the remaining first portion 398 is color coded green, and the already presented second portion 399 is color coded red. If the viewer wishes to switch to "Family1", the viewer may, for example, select either the outer box 384 or the first portion 398 to immediately begin viewing "Family1" live. Upon such a selection, the tuner 304 will immediately tune to channel 2 and show "Family1" on the display 206. Alternatively, the viewer may select the second portion 399 to indicate a desire to view "Family1" from the beginning. In response, the content receiver 202 will engage the scheduled programming recommendation system database 318 and begin playback of the second portion 398 from the memory within the DVR 306. Meanwhile, the scheduled programming recommendation system 200 continues recording the first portion 398 of "Family1" to the scheduled programming recommendation system database 318.

In one embodiment, the "Next" display format 382 is similar to the "Switch to" display format 380, except that the graph 392 will not show two different portions, because the program has not started yet. At 12:45 pm, the scheduled programming recommendation system 200 will tune to channel 45 and begin recording "Family3". If the content receiver 202 is equipped with a second tuner 304, the second tuner 304 will tune to channel 99 at 1:15 pm and begin recording "Comedy4". If a program that the user has already watched appears in the recommended list, an indicator 387 such as an asterisk (*) may be used to alert the user that the program appears in the user's viewing history.

In one embodiment, programs on the "Next" and "Switch to" lists can be recorded for viewing at a later time. In such a case, the recordings can be stored in the DVR instead of in a separate, hidden memory location such as the SPCRS database 318, so that the user can easily access the recording at any time until it is deleted or purged.

Figure 8:
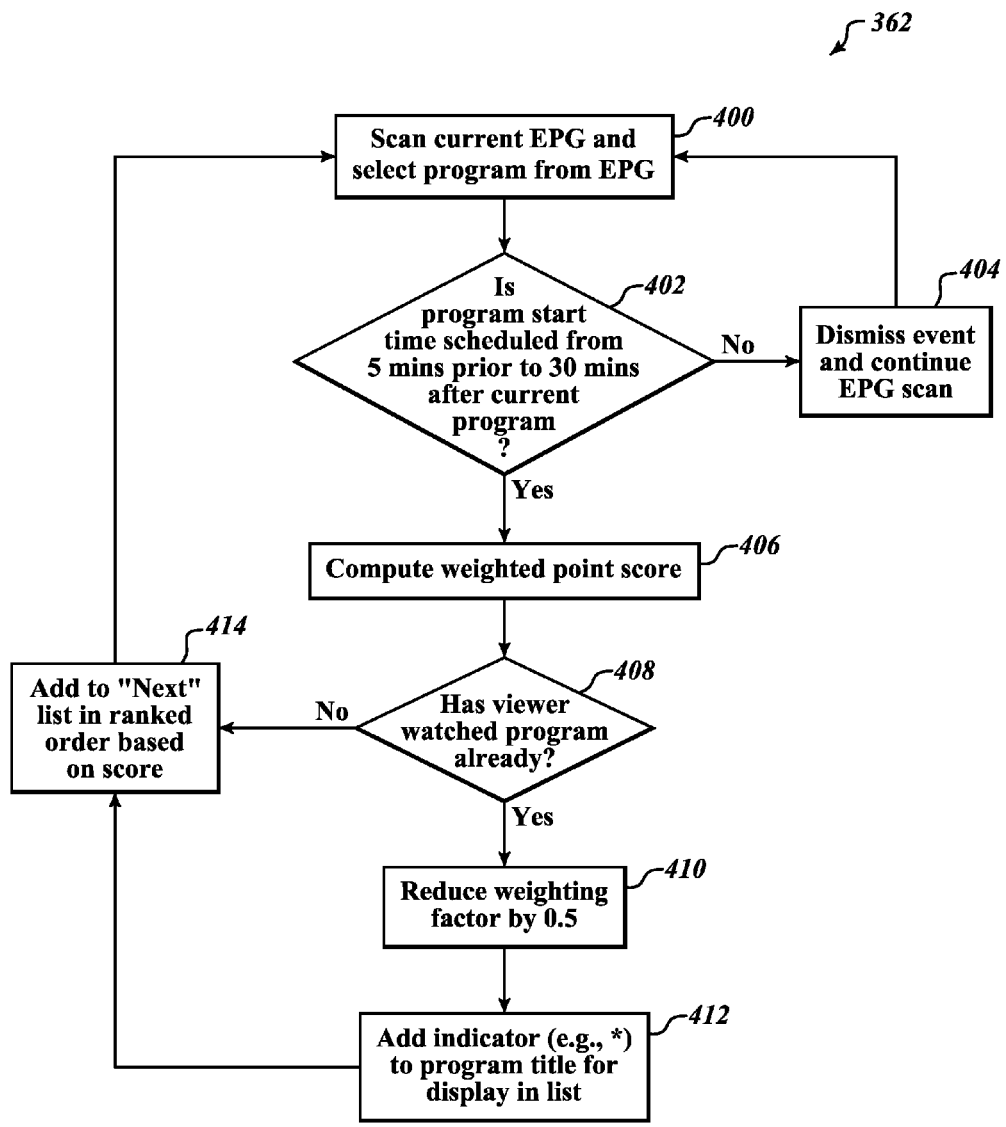
FIG. 8 is a flow chart showing a sequence of steps in an exemplary method of building a "Next" list of recommended programs, according to one embodiment described herein.

With reference to FIGS. 3 and 8, the method 362 of building the "Next" list 386 of recommended programs is shown and described in greater detail, according to one embodiment. Updating the "Next" list 386 can occur periodically in the background. For example, the recommendation engine 317 is programmed to look ahead in the EPG 340 and see that at 1:00 pm, the program currently being shown on channel 1 will end. The recommendation engine 317 then compiles the "Next" list 386 of about a dozen recommended programs that the viewer may want to watch next instead of "Drama1." For example, the "Next" list 386 of recommended programs may include "Comedy4" on channel NNNN, "Family3" on channel 45, wherein "Comedy4" is prioritized ahead of "Family3." Updating the "Next" list 386 can also be programmed to occur in response to a request from the user to display the recommended lists. The "Next" list 386 need not be tied to a channel that the user is currently tuned into. Accordingly, the "Next" list 386 can be compiled from programs that will air over the next 2-3 hours, for instance. If the next program to be transmitted on channel 1 does not interest the current viewer, the viewer can trigger display of the recommended "Next" list at any time.

At 400, the recommendation engine 317 scans the entire EPG 340 to search for programs scheduled in upcoming timeslots and rank the programs according to the algorithm described below and shown in Tables I, II, and III. For each candidate next program identified, the following steps are executed:

At 402, the recommendation engine 317 verifies whether or not the scheduled start time for the candidate next program is in the desired range of, for example, five minutes prior to, and 30 minutes after, the end of the current program. Such a desired range can be included as user-configurable data in the user preferences 374.

At 404, if the scheduled start time is not in the desired range, the program is dismissed and the EPG scan continues.

At 406, a score is determined for the candidate program by computing a weighted point value based on a comparison of viewing history data and characteristics of the candidate program obtained from the EPG. Categories are used as attributes to determine events of interest to the viewer. Exemplary data and associated points are shown in Tables I, II, and III. As an example, if the movie "Memento" is found to be scheduled in the desired range of start times, its characteristics are obtained from the EPG such as genre, actors, director, scheduled time of day, and the like. For example, if the EPG indicates that the movie "Memento" is scheduled in the evening, according to Table II, "Memento" will be assigned 37 points. According to Table III, "Memento" will be assigned 6 additional points because the EPG characterizes "Memento" in the genre of thriller, plus 6 additional points because the EPG also characterizes "Memento" in the genre of mystery. For some subscribers, the comedy and family genres may be assigned more points, whereas, for other subscribers, thriller and drama genres may receive more points. According to tables based on other categories not shown, "Memento" will be assigned additional points based on the director, actors, and so forth that are indicated in the EPG. The score for "Memento" is then computed as the cumulative point total from the data tables for each of the characteristics of "Memento" which are given in the EPG.

At 408, recommendation engine 317 consults the viewer history to determine whether or not the viewer has already watched the candidate program.

At 410, in response to a determination that the viewer has already watched the candidate program, the weighting factor is reduced by 0.5, for example, to de-prioritize the program.

At 412, an indicator 397 such as an asterisk (*) is added to the program title, in case the program qualifies for display in the "Next" list, to remind the viewer that they have already watched the program being recommended.

At 414, scores for the various candidate programs are ranked from highest to lowest, and candidates having the highest ranked scores are then assigned to the "Next" list 386 in rank order.

Figure 9:
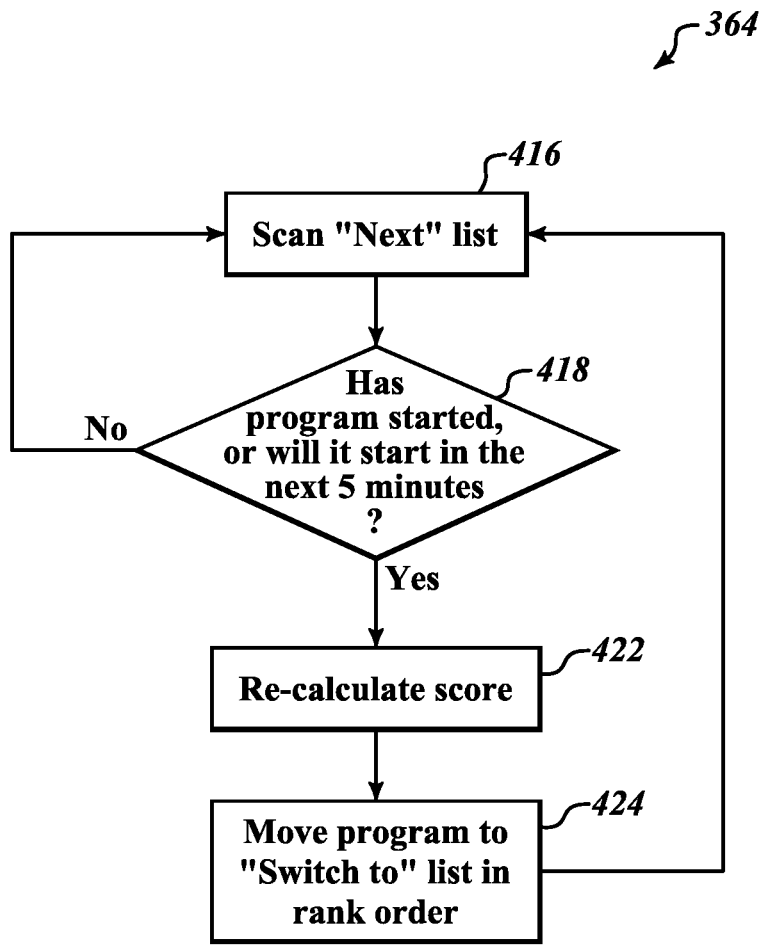
FIG. 9 is a flow chart showing a sequence of steps in an exemplary method of building a "Switch to" list of recommended programs, according to one embodiment described herein.

With reference to FIG. 9 and the example shown in FIG. 3, the method 364 of building the "Switch to" list 384 of recommended programs is shown and described in greater detail, according to one exemplary embodiment.

At 416, the recommendation engine 317 scans the "Next" list 384 and the current EPG 340 to search for candidate programs currently being transmitted in the 12:30 time slot, as alternative options for the viewer, in case the viewer wants to check alternative options e.g., if the viewer is not interested in continuing to watch the current program.

At 418, for each candidate program, the recommendation engine 317 verifies whether or not the candidate program has already started or is scheduled to begin in the next five minutes. The time range that defines eligible "switch to" candidates can be included as user-configurable data in the user preferences 374. if the scheduled start time is not in the desired range, the program is dismissed and the scan continues until an eligible candidate is found.

At 422, the historical data stored in Table I is updated, and the score is re-calculated for the candidate program by re-computing a new weighted point value from the updated historical data. Exemplary data and associated points are shown in Tables I, II, and III.

At 424, scores for the various candidate programs are ranked from highest to lowest, and candidates having the highest ranked scores are then assigned to the "Switch to" list 384 in rank order. The recommendation engine 317 then compiles the "Switch to" list 384 of about a dozen recommended programs that the viewer may want to switch to now instead of continuing to watch channel 1. For example, the "Switch to" list 384 of recommended programs may include "Family1" on channel 2, but not "Drama2" on channel 45. If a program from the "Next" list 386 is added to the "Switch to" list 384, the program is then deleted from the "Next" list 386.

With reference to Tables I, II, and III shown in FIGS. 11, 12, and 13, respectively, an exemplary algorithm for use by the recommendation engine 317 to accumulate point scores for candidate programs will now be described. Accumulated point scores and weighting factors assigned to each candidate program are based on, for example, information provided in the EPG 340 compared against user attributes, e.g., age, gender, user preferences such as favorite actors, genres, subject matter, favorite sports, and the like, user viewing history, such as, for example, frequency of viewing a particular program series, or history indicating the viewer has already seen a candidate program recently. For example, if the user is known to prefer comedies, if there are two candidate comedies to recommend and the viewer history shows the viewer watched one of the two programs yesterday, the comedy that the viewer has not yet seen can be assigned higher point value. Alternatively, if the user has not seen either of the comedies recently, and the user's favorite actor appears in one of the two programs, that program would be assigned a higher point score.

Table I is a data table that summarizes a user's viewing history, according to one embodiment. Each row of Table I represents a programming event that has been watched by the user, such as a specific TV series, a movie, a sporting event, a news show, and the like. For each program, the recommendation engine 317 stores in the SPRS database 318 the number of minutes that the user has spent watching the program. Each column of Table I summarizes stored information associated with the program such as, for example, content type, genre, actors, director, and the like.

It is noted that each program may be associated with more than one genre, for example, mystery/thriller/action, or comedy/drama. For each attribute, the recommendation engine 317 computes the total number of minutes spent by the user watching events linked to that attribute. When an event is linked to multiple attributes, the recommendation engine 317 computes a cumulative total time spent watching events linked to the multiple attributes.

Table II is an exemplary points table that summarizes data from Table I by content type, and tracks points assigned to each program. The points are assigned based, at least in part, on the user's history of watching a particular content type, as recorded in Table I. Each row of Table II corresponds to a different content type. Each column of Table II contains numerical point values used to accumulate the score. Such values include, for example, a weighting factor, total minutes spent watching the program type during the morning, afternoon, and evening, and points assigned based on the minutes watched. For example, the first two rows of Table I list the TV series "Bones" and "Friends". Column 4 of Table I shows that the viewer spent 92 minutes watching "Bones" in the afternoon and 180 minutes watching "Friends" in the afternoon. The total number of minutes spent watching TV series in the afternoon was 180+92=272 minutes, which is summarized in column 4 of Table II. Total time spent watching movies in the afternoon was 110 minutes, and so on.

Points are then assigned to the programs in the category "Series" based on a percentage of the total afternoon viewing. For example, the percentage of time watching series in the afternoon is 272/382=71%. Likewise, points are assigned to each one of the movies watched, based on a percentage of the total afternoon viewing, or 110/382=29%. Accordingly, 71 points are awarded to each afternoon TV series and 29 points are awarded to each afternoon movie. Thus, a "Friends" episode showing at 4 pm would receive a score of 71. The score is then multiplied by the weighting factor in the first column.

Table III is an exemplary points table that tracks points assigned to each program based on the user's history of watching a particular genre, as listed in Table I. For example, the user watched 202 minutes of drama in the afternoon, out of 966 total minutes of afternoon viewing. Each afternoon drama program then receives 202/966=28%, or 28 additional points based on its genre and scheduled time of day.

Additional tables not shown explicitly herein track points assigned to each program based on the user's preferred actors, directors, and any further columns that may exist in Table I. Thus, each category included in Table I has an associated points table.

Figure 10:
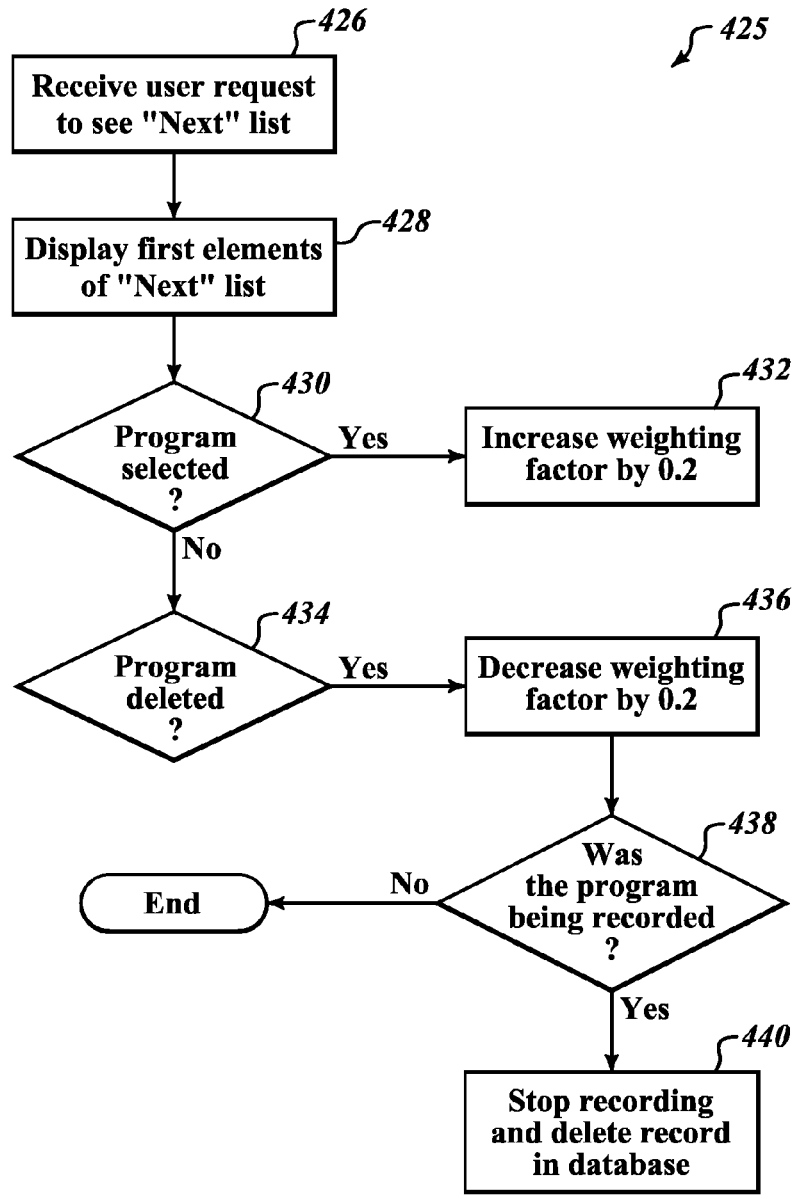
FIG. 10 is a flow chart showing a sequence of steps in an exemplary method of adjusting a weighting factor based on user input, according to one embodiment described herein.

The weighting factors that appear in Tables II and III initially are set to 1. In addition to modifying the weighting factors as described above, weighting factors can also increase or decrease based on user input, according to an exemplary weighting factor algorithm 425 as shown in FIG. 10 and described below.

At 426, a request is received from the user via the remote control 208 to see the "Next" list 386.

At 428, in response to the user request, elements of the Next list having the highest ranking are presented on the display 206. For example, the top 10 programs on the "Next" list 386 can be displayed.

At 430, it is determined that a user has selected "Bones" from the "Next" list via the remote control 208.

At 432, in response to the user selection, the weighting factors for all of characteristics associated with "Bones" are increased. For example, the weighting factor for Series in Table II is raised by 0.2 to 1.2. In addition, the weighting factors for the genres associated with "Bones", comedy, crime, and drama in Table III, are each raised by 0.2 to 1.2.

At 434, it is determined that a user has deleted "Bones" from the "Next" list via the remote control 208.

At 436, in response to the user deletion, weighting factors for all of the characteristics associated with "Bones" are lowered. For example, the weighting factor for Series in Table II is lowered by 0.2 to 0.8, and the weighting factors for the genres comedy, crime, and drama in Table III are also lowered by 0.2 to 0.8. If the user further deletes "Friends" from the "Next" list, the weighting factor for Series in Table II is lowered again from 0.8 to 0.6. In addition, the weighting factor for Comedy in Table III is further lowered from 0.8 to 0.6, and the weighting factor for Romance in Table III is lowered from 1.0 to 0.8.

At 438, it is determined whether or not "Bones" was being recorded to the SPRS database 318.

At 440, in response to the user deletion and the recording status, if the program is being recorded, the recording is stopped. The portion of the program that was already recorded is then deleted from the SPRS database 318.

Although the above description pertains to scheduled television programs, the scope of the present disclosure is not so limited, and is intended include radio broadcasts, satellite radio, scheduled programming available via Internet streaming, and the like.

While particular devices and methods for recommending scheduled programming to a user have been described with respect to the Figures, many other devices and methods can be implemented utilizing principles of the present disclosure, as will be apparent to those of skill in the art, in light of the present disclosure. All such other devices and methods fall within the scope of the present disclosure. The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A scheduled programming recommendation system, comprising:
    a media presentation device having a display; and
    a content receiver coupled to the media presentation device, the content receiver including
        a tuner;
        a digital video recorder that stores recommended programs for a limited time period without user input;
        a microprocessor; and
        a non-transitory computer-readable memory in communication with the microprocessor, the memory having computer-executable instructions stored thereon that cause the microprocessor to:
            output to the media presentation device a scheduled entertainment program that is being transmitted on a first channel;
            identify a present user of the media presentation device;
            gather user history data;
            analyze the user history data to determine user preferences;
            compile a prioritized list of recommended programs based on the determined user preferences, the list of recommended programs including a first portion that lists programs currently being transmitted on channels other than the first channel and a second portion that lists programs scheduled to be transmitted later within a selected time interval;
            in response to at least one recommended program listed in the second portion of the prioritized list being transmitted on a channel other than the first channel, modify the first portion of the prioritized list to list the at least one recommended program and modify the second portion of the prioritized list to remove the at least one recommended program;
            record, in the digital video recorder and without input from the present user, the at least one recommended program from the first portion of the prioritized list of recommended programs that is currently being transmitted;
            present on the display, the prioritized list of recommended programs, in response to a user request;
            update the first portion of the prioritized list of recommended programs to remove the at least one recommended program from the prioritized list of recommended programs; and
            in response to the update of the prioritized list of recommended programs, delete the at least one recommended program from the digital video recorder without receiving a delete instruction from the present user.

2. The scheduled programming recommendation system of claim 1, further comprising a remote control that supports wireless communication with the content receiver wherein the remote control includes a dedicated pushbutton that transmits the user request to the content receiver when activated, triggering display of the first portion of the prioritized list of recommended programs.

3. The scheduled programming recommendation system of claim 1 wherein the content receiver includes one or more of a radio that provides scheduled radio content to the media presentation device, a set top box that provides scheduled television content to the media presentation device, or a networked device configured to receive media content via the Internet and present the content on the media presentation device.

4. The scheduled programming recommendation system of claim 1 wherein the media presentation device includes one or more of a television, a radio, a computer, a laptop, a tablet, or a smart phone.

5. The scheduled programming recommendation system of claim 1 wherein users are identified by user profiles stored in the content receiver.

6. The scheduled programming recommendation system of claim 5 wherein the user profiles specify a maximum number of recommended programs on the prioritized list.

7. The scheduled programming recommendation system of claim 1 wherein the user history data is associated with the present user's past program selections.

8. The scheduled programming recommendation system of claim 1 wherein the first portion of the prioritized list of recommended programs that is currently being transmitted includes an indication of total program run time and the length of time remaining in the program.

9. The scheduled programming recommendation system of claim 1 wherein a number of recommended programs recorded in the digital video recorder is based on a number of tuners in the content receiver.

10. A computer-implemented method, comprising:
identifying, using a microprocessor of a content receiver, a present user of a media presentation device;
gathering user profile information from a database within a content receiver provided by a scheduled media service, the database including a background content storage module that stores candidate programs for a limited time period without user input;
analyzing the user history information to determine user preferences;
searching an electronic program guide, within a selected time interval, to find candidate programs that satisfy selected criteria based on the user preferences;
compiling a list of recommended programs from the candidate programs based on the determined user preferences, wherein the list of recommended programs includes a first portion that lists programs currently being transmitted and a second portion that lists programs scheduled to be transmitted;
in response to one or more of the recommended programs in the second portion of the list of recommended programs being currently transmitted, adding the one or more recommended programs to the first portion of the list of recommended programs and removing the one or more recommended programs from the second portion of the list of recommended programs,
in response to the one or more recommended programs being added to the first portion of the list of recommended programs, automatically recording, in the background content storage module and without input from the present user, the one or more recommended programs;
presenting the list of recommended programs to the user, in response to a user request;
updating the first portion of the list of recommended programs to remove the one or more recommended programs from the list of recommended programs; and
in response to the updating of the list of recommended programs, deleting the one or more recommended programs from the background content storage module without a delete instruction being input from the present user.

11. The method of claim 10 wherein the user request is relayed to the content receiver by a remote control device having a dedicated pushbutton.

12. The method of claim 10, wherein the selected time interval is in the range of about −5 to 30 minutes.

13. The method of claim 10, wherein the selected criteria include one or more of content type, genre, director or actor.

14. The method of claim 10, further comprising:
prompting the user for input to assist in determining user preferences.

15. The method of claim 10, wherein deleting the one or more recommended programs from the background content storage module is performed after a selected time interval has passed since the one or more recommended programs has been removed from the list of recommended programs.

16. The method of claim 10, further comprising, computing a weighted score for each candidate program, wherein the computing of the weighted score includes accumulating points based on a comparison of user history data with program guide data.

17. The method of claim 16 wherein the list of candidate programs are ranked according to their weighted scores.

18. The method of claim 10, further comprising altering a weighting factor according to user input.

19. The method of claim 10, further comprising altering a weighting factor according to user viewing history.

20. The method of claim 10 wherein subscription programs included in the list of recommended programs are prioritized ahead of other programs that incur additional fees.

21. The method of claim 10, further comprising sharing the list of recommended programs with other users or subscribers via text, e-mail, or a network-based forum.

22. The method of claim 10, further comprising storing one or more of the recommended programs on the list in a memory associated with a digital video recorder that is separate from the database.

23. The system of claim 1 wherein the recommended programs include one or more of subscription content, pay-per-view programs, video-on-demand programs, advertising, or promotional content.

* * * * *